Patented Feb. 9, 1937

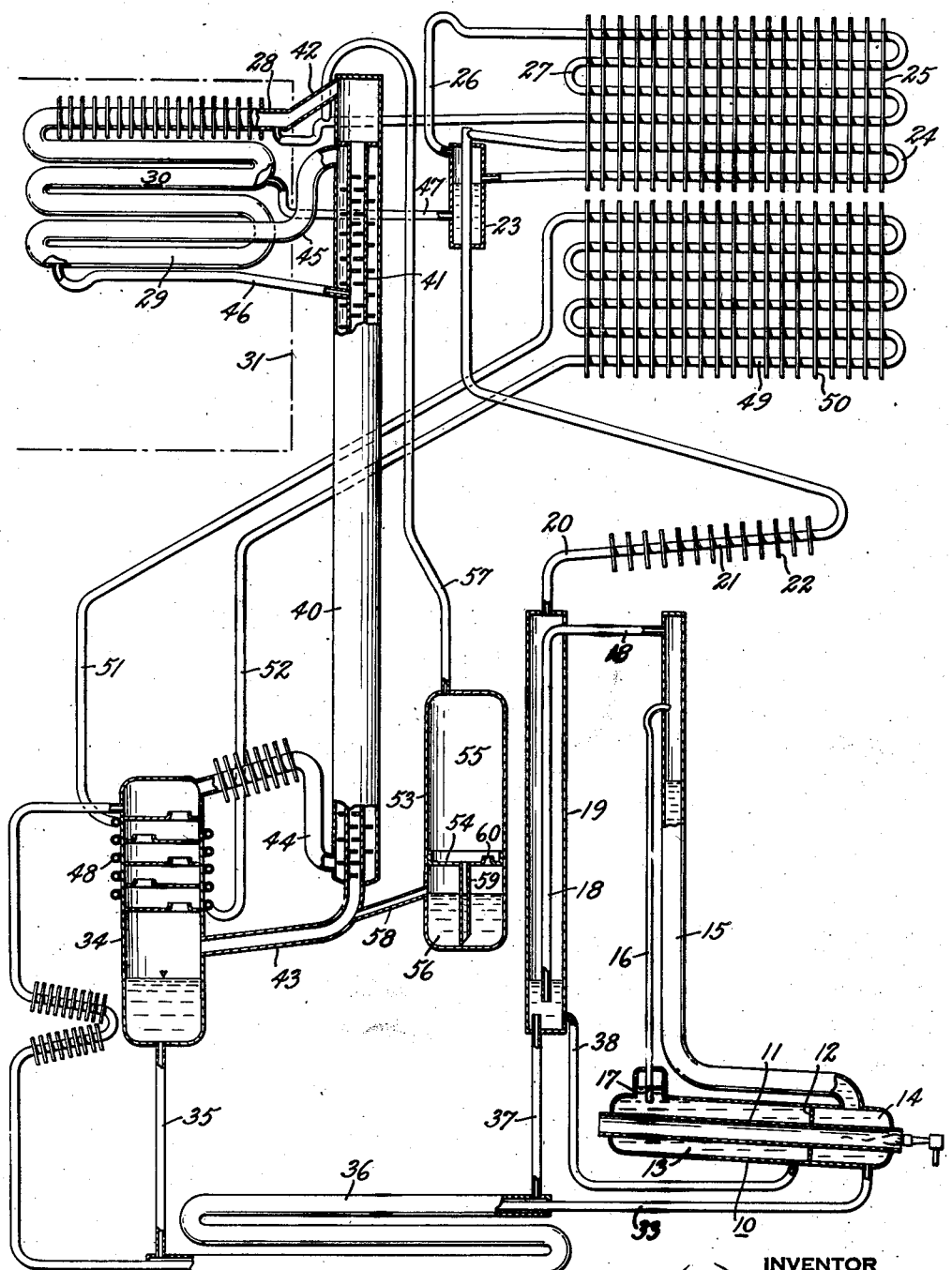

2,069,865

UNITED STATES PATENT OFFICE 2,069,865

REFRIGERATION

Hugo M. Ullstrand, Evansville, Ind., assignor, by mesne assignments, to Servel, Inc., Dover, Del., a corporation of Delaware Application October 25, 1934, Serial No. 749,871

14 Claims. (Cl. 62—119.5)

My invention relates to absorption refrigeration apparatus of the type employing an auxiliary agent, such as hydrogen, in the presence of which a cooling agent, such as ammonia, evaporates.

The object of the invention is to effectively vary operating conditions to suit variations in load and external conditions. In accordance with the invention the capacity of the refrigerating system is automatically varied by accumulation of cooling agent in substantially pure state.

The nature of the invention will be apparent from the following description taken in conjunction with the accompanying drawing showing more or less diagrammatically an absorption refrigerating system embodying the invention.

Referring to the drawing, the refrigeration system shown includes a generator 10. A flue 11 extends through the generator. A partition 12 divides the generator into a strong solution chamber 13 and a weak solution chamber 14. A pipe 15 which may be termed a standpipe is connected to the top of chamber 14 and extends upwardly. The lower end of a narrow gas lift pipe 16 is within the upper part of chamber 13 and the pipe extends upwardly to connect at a relatively high elevation with the standpipe 15. Pipe 16 is provided with an opening 17 within chamber 13. A vapor conduit 18 is connected to the upper part of the standpipe 15 and extends downwardly within an analyzer vessel 19 and opens therein near the bottom thereof. A vapor conduit 20 is connected to the upper part of vessel 19 and has an inclined portion 21 provided with heat radiating fins 22. This portion constitutes a primary rectifier for return of absorption liquid entrained with vapor driven off in the generator. Conduit 20 passes through a rectifier jacket 23 and at its upper end is connected to a condenser loop 24 embedded in condenser fins 25. The lower end of the condenser loop 24 is connected to jacket 23. A conduit 26 is connected to the upper part of jacket 23 and is connected to a condenser coil 27 also embedded in the fins 25. The lower end of the condenser coil 27 is connected to the upper part 28 of an evaporator generally designated by numeral 30. The lower part of the evaporator consists of a number of loops which are adapted to support trays for freezing ice or cooling to low temperature. The upper part 28 of the evaporator is provided with heat transfer fins and serves to cool a refrigerator food space, indicated by dot and dash lines 31, the food space being suitably insulated.

A conduit 33 connects chamber 14 of generator 10 with the upper part of an absorber 34. The lower part of the absorber is connected by conduits 35, 36 and 37 with the lower part of the analyzer vessel 19. A conduit 38 connects the lower part of vessel 19 with the chamber 13 of generator 10. Conduit 36 is disposed around conduit 33 to form a liquid heat exchanger. Connected between the absorber and evaporator is a gas heat exchanger including an outer conduit 40 and an inner conduit 41. The inner conduit communicates with the upper part of the evaporator through conduit 42 and with the lower part of the absorber by means of conduit 43. The outer conduit of the heat exchanger communicates with the upper part of the absorber by means of a conduit 44 and with the lower part of the evaporator by means of conduit 45. A drain conduit 46 connects the lower part of the evaporator with the inner conduit 41. A conduit 47 connects jacket 23 with the low temperature part 29 of evaporator 30.

The absorber may be cooled by a secondary hermetically sealed system including a coil 48 in heat exchange relation with the absorber, a coil 49 embedded in fins 50 and subject to air cooling, and conduits 51 and 52 connecting the coil 58 with the coil 49. This secondary system is in part filled with a volatile liquid such as methyl chloride.

The system as so far described is known, and forms the general subject matter of a number of United States patents including Patents Nos. 1,609,334; 1,645,706; 1,651,007; 1,674,830; 1,808,723; 1,823,456; 1,830,203; 1,880,533; and 1,884,939, to which reference may be had for a further and more detailed study of the general system.

Coming now to the present invention, I provide a storage vessel 53 divided by a partition 54 into a gas chamber 55 and a liquid chamber 56. The gas chamber 55 is connected by means of a tube 57 with the lower end of the condenser coil 27. Chamber 56 is connected to conduit 43 by means of a conduit 58. This conduit is connected to chamber 56 well above the bottom thereof, and slopes downwardly toward the conduit 43, whereby liquid may overflow from chamber 56 through conduit 58 and through conduit 43 to a pool of liquid in the bottom part of the absorber. It will be noted that the connecting point of conduit 58 to the vessel 53 is well above the liquid level in the absorber 34. The bottom of the vessel 53 forms a pocket for liquid. A tube 59 passes through partition 54 and opens at the bottom of chamber 56 so that liquid may drain from chamber 55 to the bottom of chamber 56. Partition 54 is also provided with a gas passage 60 having a raised rim so that liquid will not pass through the same but will be forced to pass downwardly in conduit 59. Storage vessel 53 is exposed so as to be cooled by air.

The operation of the system in general is as follows:

Heat is applied to the generator 10. This heat may be applied by an electric heating element in flue 11 or a gas burner directing its flame thereinto. The generator contains a solution of cooling agents in absorption liquid, for example, ammonia dissolved in water. Application of heat to the generator causes formation of vapor. Vapor collects in the upper part of chamber 13 and passes through hole 17 into pipe 16. Liquid is also carried along and liquid and vapor flow upwardly through conduit 16 due to the formation of gas. This is a gas lift action. Vapor and liquid discharged from conduit 16 into standpipe 15 are separated therein and the vapor flows through conduit 18 into the bottom of analyzer vessel 19. The vapor bubbles through liquid in the bottom of vessel 19 and passes upwardly therein around pipe 18 and through pipe 20. In the part 21 some of the entrained water vapor is condensed due to the cooling by air, and flows back through conduit 20 into the vessel 19. The vapor continues upwardly and more absorption liquid is removed from the vapor on account of heat exchange with liquid ammonia in jacket 23. The vapor enters condenser loop 24 and is in part condensed. Condensate and uncondensed vapor pass into jacket 23. The liquid flows through conduit 47 into the lower part of evaporator 30. The gas passes through conduit 26 to the condenser section 27, condensate flowing therefrom into the upper evaporator section 28.

In the evaporator, the condensed ammonia meets a gas stream entering the evaporator through conduit 45 and flowing generally upward therein. This gas is hydrogen with some ammonia mixed with it, but of such low proportion of ammonia that the liquid ammonia can evaporate and diffuse into it. This gas entering the evaporator is generally termed weak gas, and may conveniently be referred to as substantially pure hydrogen. Evaporation of the ammonia produces refrigeration. The resulting heavy or strong gas mixture formed in the evaporator passes through conduit 42 and downwardly through the inner tube 41 of the gas heat exchanger and through conduit 43 into the lower part of the absorber.

Liquid flows from chamber 14 of the generator through conduit 33 and into the top of the absorber. This absorption liquid has been deprived of ammonia and may be termed weak or poor solution. It flows over baffles within the absorber 34 and absorbs ammonia out of the gas mixture, leaving the gas with a large percentage of hydrogen. The gas flows from the upper part of the absorber through conduit 44 upwardly through the gas heat exchanger, around tube 41, and back through conduit 45 into the evaporator. Flow is maintained between the evaporator and the absorber due to the preponderance of specific weight of the strong gas within tube 41 over the specific weight of the weak gas around tube 41. Enriched absorption liquid flows through conduit 35, conduit 36 and conduit 37 into the anlyzer 19, where the liquid level stands at substantially the level in the absorber. Vaporization of some ammonia and removal of some water vapor takes place in the analyzer due to the vapor bubbling through the strong absorption liquid. The strong absorption liquid flows through conduit 38 into chamber 13 and is thence lifted through conduit 16 into standpipe 15.

In placing the several fluids in the above described system, which may be referred to as charging, a solution of refrigerant or cooling fluid in an absorption liquid is admitted through a suitable charging plug, not shown, for instance, in the lower part of the absorber 34. The solution is of such concentration and in such quantity as may be found desirable for best operation of the system under a normal set of conditions. For instance, a water solution of 30% ammonia may be admitted to the level of the charging plug. The inert pressure equalizing gas, such as hydrogen, is admitted, also through the charging plug, at a pressure such that the total pressure in the system will be that at which ammonia will condense at a desired temperature, which temperature is preferably a relatively high room temperature.

Referring now with more particularity to the present invention, the vessel 53, usually referred to as a pressure vessel, is constructed and arranged, as previously described, to perform a dual function. If the temperature of the air acting as the cooling medium for the condensers 24 and 25 rises above the condensation temperature of the ammonia at the charging pressure, it is desirable to increase the total pressure within the system in order to obtain complete condensation of the ammonia at such higher temperature. This is automatically accomplished by means of the above described pressure vessel 53. Upon rise in room temperature above said predetermined value, uncondensed ammonia vapor flows from the lower end of the condenser coil 25 through conduit 57 into the vessel 53, displacing hydrogen gas from the vessel 53 through conduit 58 into the gas circuit including the evaporator and absorber. Displacement of the hydrogen gas out of storage in the vessel 53 into the active gas circuit is accompanied by a rise in pressure within the system. This pressure increase continues until the pressure within the system reaches that value at which complete condensation of ammonia again occurs.

The pressure control function of the vessel 53 may probably be best understood by considering what would happen if this vessel were not present. Upon rise in room temperature, as in the previously described situation, uncondensed ammonia vapor would be delivered directly into the absorber-evaporator gas circuit without materially increasing the quantity of hydrogen in this circuit, with the result that the partial pressure of the ammonia in the gas circuit would tend to increase and more rapid absorption of ammonia take place in the absorber without material increase in total pressure until expulsion of vapor exceeded its absorption. In other words, ammonia vapor would pass from the condenser to the absorber without performing any useful function. On the other hand, however, when there is a store of hydrogen, as in the vessel 53, which is displaced into the gas circuit by the ammonia vapor, the partial pressure of the inert hydrogen in the active portion of the system is increased to compensate for the increased quantity of ammonia vapor, and thereby permit the desired increase in total pressure.

The other function of the vessel 53 is to accumulate substantially pure liquid ammonia outside of the active portion of the refrigeration system and thus decrease the concentration of solution in the system under abnormal conditions such as high room temperature and high heat inputs. It will be understood that decrease in concentration of solution under high load conditions results in an increase in capacity. It is also understood, however, that such decrease in concentration is not desirable except during such periods for the reason that operation under normal conditions would be at a decrease in efficiency.

Assuming an abnormal condition, as previously described, whereby uncondensed ammonia vapor passes through conduit 57 into the vessel 53, the latter, being exposed to air, functions as a continuation of the condenser coil 25, and ammonia vapor is therein condensed to liquid which is collected on the partition plate 54 from which the liquid drains through conduit 59 into the bottom of the chamber 56 of the vessel 53. Since conduit 58 is connected to the vessel 53 at a point considerably above the bottom of this vessel, a quantity of pure liquid ammonia will be accumulated outside of the active portion of the system during abnormal conditions. When the level of liquid in the chamber 56 reaches the opening of conduit 58, the liquid overflows through conduit 58 and conduit 43 into the lower part of the absorber 34, thus being returned to the liquid circuit. It will be understood that arrangement may be made for overflow of liquid from the lower part of the vessel 53 to any desired portion of the liquid circuit. In the described arrangement, however, conduit 58 serves both as an overflow for liquid and a conduit for gas. If the overflow liquid from the lower part of the vessel 53 is to be returned to the liquid circuit at any point below the level of liquid therein, it will be necessary to provide a separate conduit for gas from the vessel 53 to the absorber-evaporator gas circuit.

In the vessel 53, the conduit 59 is extended to the bottom of the chamber 56 for the purpose of creating what may be referred to as a purging action. It is desirable that all the space in the chamber 56 of the vessel 53 be available for storage of pure liquid ammonia during abnormal conditions. If there should be some solution present in the chamber 56, it would normally tend to remain at the bottom, being of greater specific gravity than the pure liquid ammonia. By extending the conduit 59 to the bottom of chamber 56, liquid ammonia descending through conduit 59 is delivered at the very bottom of the chamber 56, and beneath any solution that may be contained therein, mechanically causing the solution to rise in the chamber 56 and overflow through conduit 58 when the liquid level reaches the connecting point of conduit 58 to the chamber 56.

Upon return to normal conditions, the partial pressure of ammonia in the vessel 53 will decrease due to complete condensation of ammonia in the condenser coils 24 and 25. Thereupon, liquid ammonia contained in chamber 56 below the level of the connecting point of conduit 58 thereto will evaporate and thus be returned to the active portion of the system where it is desired during normal operation. Upon decrease in partial pressure of ammonia in the vessel 53, the partial pressure of hydrogen will increase, the hydrogen returning from the active portion of the system through conduit 58 into the vessel 53.

It will be understood by those skilled in the art that various changes and modifications may be made within the spirit and scope of my invention which is therefore not limited to that which is described in the specification and shown in the drawing, but only as indicated in the following claims.

What I claim is:

1. In a refrigerating system of the absorption type employing an auxiliary agent into which the cooling agent diffuses, members forming a path of flow for the auxiliary agent including an absorber, a storage vessel for auxiliary agent connected to receive uncondensed cooling agent a partition in said storage vessel dividing the same into a gas chamber and a liquid chamber, a connection between said storage vessel and said path of flow, and means to conduct liquid from said gas chamber to said liquid chamber.

2. In a refrigerating system of the absorption type employing an auxiliary agent into which the cooling agent diffuses, members forming a path of flow for the auxiliary agent including an absorber, a storage vessel for auxiliary agent connected to receive uncondensed cooling agent, a partition in said storage vessel dividing the same into a gas chamber and a liquid chamber and having a gas passage, a connection between said liquid chamber and said path of flow connected to said liquid chamber well above the bottom thereof, and a conduit connecting said gas chamber with the bottom of said liquid chamber.

3. In a refrigerating system of the absorption type employing an auxiliary agent into which the cooling agent diffuses, members forming a path of flow for the auxiliary agent including an absorber, a storage vessel for auxiliary agent connected to receive uncondensed cooling agent, a single connection between said storage vessel and said path of flow connected to said storage vessel well above the bottom thereof, and means to cause condensate formed in said vessel to flow to the bottom thereof and thence upwardly to said connection.

4. In a refrigerating system of the absorption type employing an auxiliary agent into which the coling agent diffuses, members forming a path of flow for the auxiliary agent including an absorber, a storage vessel for auxiliary agent connected to receive uncondensed cooling agent, and connecting means between the said storage vessel and said path of flow arranged to provide accumulation of liquid in said storage vessel above the level of liquid in said absorber.

5. Refrigeration apparatus comprising a generator, a condenser, an evaporator, an absorber, means for circulating a cooling agent through the aforementioned parts, an auxiliary agent through the absorber and evaporator, an absorption liquid through the generator and absorber, and means for automatically accumulating cooling agent in substantially pure liquid phase to change the concentration of the absorption liquid in accordance with variations in load.

6. The method of producing refrigeration through the agency of an absorption system which comprises expelling a cooling agent from solution in an absorption liquid, converting the cooling agent to liquid phase, evaporating the cooling agent in the presence of an auxiliary agent, absorbing the cooling agent in the absorption liquid, circulating the auxiliary agent between the place of evaporation and the place of absorption, circulating the absorption liquid between the place of absorption and the place of expelling, and automatically changing the concentration of the absorption liquid in accordance with variations in load by accumulating cooling agent in substantially pure liquid phase.

7. In the method of refrigeration comprising continuous circulation of heat conducting fluid and evaporation thereof into an auxiliary agent, absorption thereof into liquid solution, expulsion thereof from said solution, and condensation thereof to liquid, the step which consists in changing the average concentration of said solution by trapping out of circulation a portion of said heat conducting fluid in substantially pure liquid phase.

8. In the method of refrigeration comprising continuous circulation of heat conducting fluid and evaporation thereof into an auxiliary agent, absorption thereof into liquid solution, expulsion thereof from said solution, and condensation thereof to liquid, the step which consists in controlling the average concentration of said solution by trapping out of circulation varying amounts of said heat conducting fluid in substantially pure liquid phase.

9. Refrigeration apparatus comprising a generator, a condenser, an evaporator, and an absorber interconnected for the circulation of cooling fluid therethrough in series and circulation of an auxiliary agent between said evaporator and absorber, and means for simultaneously increasing the quantity of circulating auxiliary agent and removing from circulation cooling fluid in substantially pure liquid phase.

10. Method of producing refrigeration through the agency of an absorption system which includes expelling cooling agent from solution in an absorption liquid, converting the cooling agent to liquid phase, evaporating the cooling agent in the presence of an auxiliary agent, absorbing the cooling agent in the absorption liquid, circulating the auxiliary agent between the place of evaporation and the place of absorption, circulating the absorption liquid between the place of absorption and the place of expelling, and automatically varying the relative proportions of circulating fluids by alternately accumulating auxiliary agent and cooling agent in substantially pure liquid phase.

11. A refrigeration system including a generator, a condenser, an evaporator, and an absorber interconnected for circulation of cooling agent therethrough in series and circulation of auxiliary agent between said evaporator and absorber, and means for alternately accumulating out of active circulation auxiliary agent and cooling agent in substantially pure liquid phase.

12. A refrigeration system including a generator, a condenser, an evaporator, and an absorber, members interconnecting said elements to form a circuit for cooling fluid therethrough in series respectively including local circuits for an auxiliary fluid between said evaporator and absorber and absorption liquid between said generator and absorber, and a vent conduit from said condenser connected to said auxiliary fluid circuit and including an enlarged chamber constructed and arranged to accumulate liquid therein to a predetermined level.

13. A refrigeration system including a generator, a condenser, an evaporator, and an absorber, members interconnecting said elements to form a circuit for cooling fluid therethrough in series respectively including local circuits for an auxiliary fluid between said evaporator and absorber and absorption liquid between said generator and absorber, a vessel having at least a portion above the level of liquid in said absorber, a vent conduit from said condenser to said vessel, and a connection between said absorber and said vessel for conducting gas therebetween and permitting overflow of liquid from said vessel into said absorber only when liquid in said vessel reaches a predetermined level.

14. In a refrigeration system of the absorption type employing an auxiliary agent into which a cooling agent diffuses, members forming a path of flow for the auxiliary agent including an absorber, a storage vessel for auxiliary agent connected to receive uncondensed cooling agent, a partition dividing said storage vessel into upper and lower chambers and having an opening therethrough surrounded by a raised rim to prevent flow of liquid therethrough from the upper side of the partition, a conduit constructed and arranged to drain liquid from the upper side of said partition to the bottom of said lower chamber, and conduit means between said vessel and said absorber for conducting gas therebetween and connected and arranged to permit overflow of liquid from the lower chamber of said vessel into said absorber only when liquid in said chamber reaches a predetermined level.

HUGO M. ULLSTRAND.